(12) United States Patent
Oono et al.

(10) Patent No.: US 6,239,852 B1
(45) Date of Patent: May 29, 2001

(54) REFLECTION-TYPE LIQUID CRYSTAL DISPLAY DEVICE

(75) Inventors: Atsuko Oono, Fukaya; Yuzo Hisatake; Yoshinori Higuchi, both of Yokohama, all of (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/343,043

(22) Filed: Jun. 29, 1999

(30) Foreign Application Priority Data

Jun. 29, 1998 (JP) .................................................. 10-181747

(51) Int. Cl.[7] .................................................. G02F 1/1335
(52) U.S. Cl. .............................. 349/112; 349/113; 349/96; 349/117
(58) Field of Search ..................................... 349/112, 113, 349/96, 117

(56) References Cited

U.S. PATENT DOCUMENTS

| | | | |
|---|---|---|---|
| 4,088,400 | * | 5/1978 | Assouline et al. .................... 353/20 |
| 4,239,349 | * | 12/1980 | Scheffer .......................... 350/347 R |
| 4,660,936 | * | 4/1987 | Nosker ............................. 350/339 D |
| 4,883,343 | * | 11/1989 | Teshirogi ............................. 350/338 |
| 4,984,872 | * | 1/1991 | Vick ...................................... 350/321 |
| 5,132,830 | * | 7/1992 | Fukutani et al. ........................ 359/67 |
| 5,629,784 | * | 5/1997 | Abileah et al. ....................... 349/112 |
| 5,682,217 | * | 10/1997 | Hisatake et al. ..................... 349/123 |
| 5,721,600 | * | 2/1998 | Sumiyoshi et al. .................. 349/119 |
| 5,724,111 | * | 3/1998 | Mizobata et al. .................... 349/112 |
| 5,731,858 | * | 3/1998 | Hisatake et al. ..................... 349/112 |
| 5,953,089 | * | 9/1999 | Hiji et al. ............................. 349/112 |
| 6,002,464 | * | 12/1999 | Fujisawa et al. .................... 349/112 |

* cited by examiner

Primary Examiner—James A. Dudek
Assistant Examiner—Tarifur R. Chowdhury
(74) Attorney, Agent, or Firm—Pillsbury Winthrop LLP

(57) ABSTRACT

A liquid crystal display device realizing both a wide view angle and a high-quality image display without "coloring" or "letter blurs" comprises a front substrate, a rear substrate facing to the front substrate, a liquid crystal layer sandwiched between the front substrate and the rear substrate, a mirror-reflection layer disposed on the rear substrate, a single refraction layer provided on an outer surface of the front substrate, a polarizing plate provided on an outer surface of the single refraction layer, and a diffusing layer provided on an outer surface of the polarizing late to diffuse light from the single refraction layer.

18 Claims, 3 Drawing Sheets

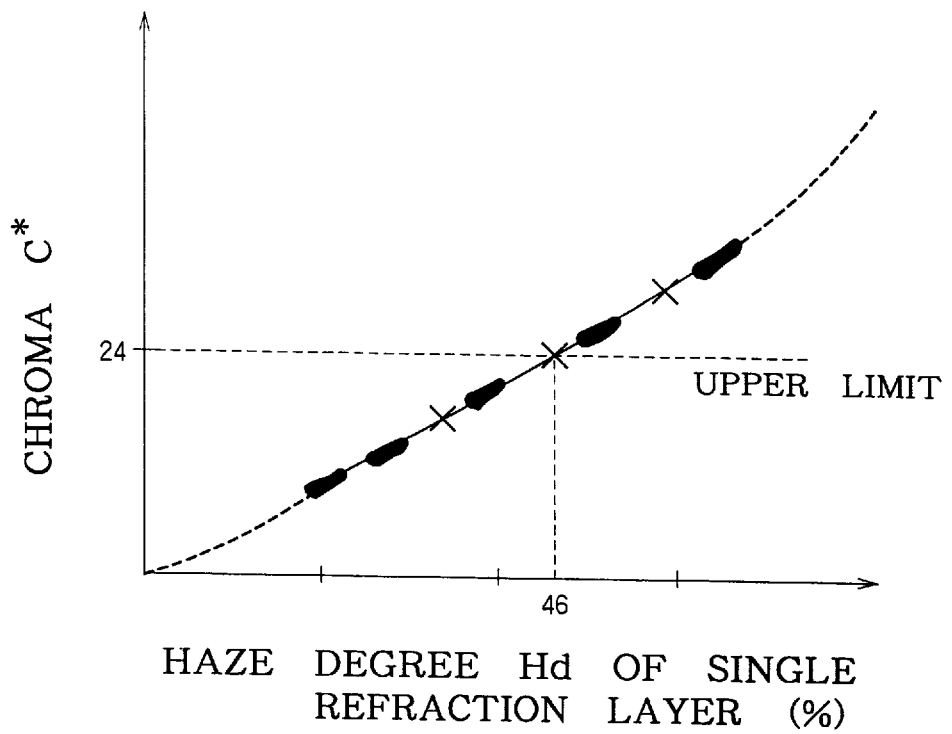
F I G. 3
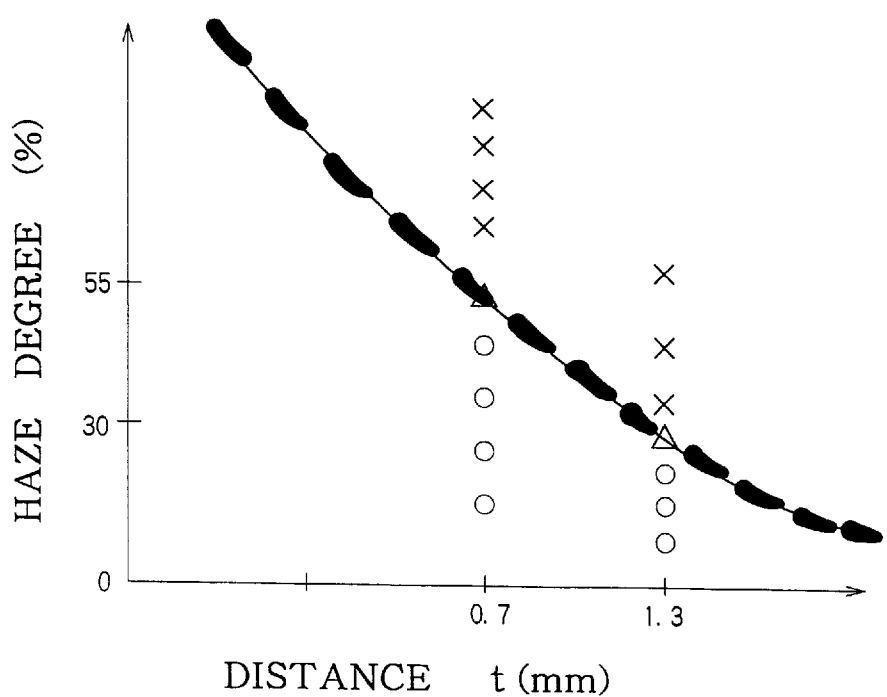
F I G. 4

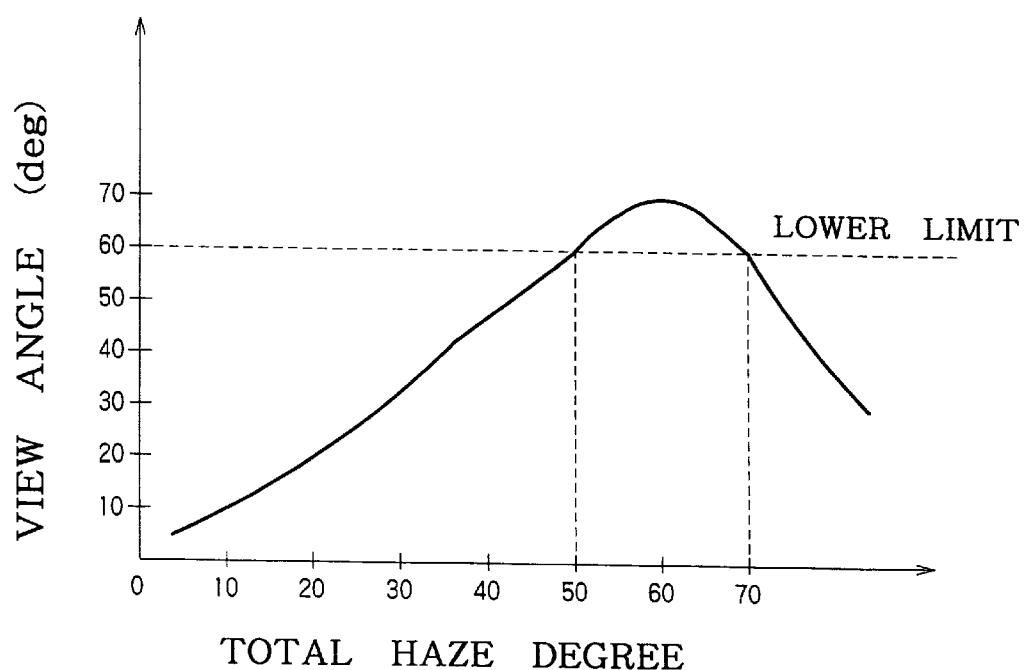
F I G. 5

REFLECTION-TYPE LIQUID CRYSTAL DISPLAY DEVICE

BACKGROUND OF THE INVENTION

This invention relates to a liquid crystal display device and, more particularly, to a reflection-type liquid crystal display device used in portable information terminals, for example.

A reflection-type liquid crystal display device using external light as its light source can be greatly reduced in consumption power as compared with transmission-type liquid crystal display devices. Therefore, there is a demand for development thereof toward the use in various portable devices such as portable information terminals, for example.

Reflection-type liquid crystal display devices are required to have a view angle not smaller than 60° under a predetermined condition. To deal with this requirement, the Inventors tried to employ an anti-glare film. That is, in a reflection-type liquid crystal display device, an anti-glare film for multiplex refraction of light from a liquid crystal layer is laid on the outer surface of a front substrate. The view angle can be increased by the film. This film simultaneously makes it possible to alleviate entry of external light caused by reflection from the surface the observer-side substrate (front substrate) on which displayed images are observed.

However, in the reflection-type liquid crystal display device using an anti-glare film, if the diffusion power is increased to ensure an ample view angle, letters on the display blur due to multiplex refraction. That is, deterioration of the display quality has been recognized as a problem.

Aside from it, the Inventors also tried to diffuse emitted light and expand the view angle by placing a single refraction layer for single refraction of light from the liquid crystal layer between the front substrate and the polarizing plate in a reflection-type liquid crystal display device.

However, in the case where the single refraction layer is interposed between the front substrate and the polarizing plate, when the refraction power is increased to obtain an ample view angle, the diffusion property gets weaker as the wavelength of light becomes longer, and wavelength dispersion occurs. It results in causing "coloring" which is the phenomenon where emitted light is recognized as different colors when observed from different angles. The Inventors has been aware of this problem through this trial.

SUMMARY OF THE INVENTION

It is therefore an object of the invention to provide a reflection-type liquid crystal display device having a sufficiently wide view angle and a high display quality.

To attain the object, the invention is characterized in sequentially stacking a single refraction layer, a polarizing plate and a diffusing layer on a front substrate. The term "single refraction layer" used in the invention pertains to a layer capable of refracting incident light while maintaining its vibrating direction. The diffusing layer pertains to a layer for refracting incident light by randomly changing its vibrating direction.

More specifically, according to the invention, there is provided a liquid crystal display device comprising:

a front substrate and a rear substrate disposed in a mutually facing relation;

a liquid crystal layer sandwiched between the front substrate and the rear substrate;

a mirror-reflection layer laid on the rear substrate;

a single refraction layer provided on an outer surface of the front substrate;

a polarizing plate provided on an outer surface of the single refraction layer; and a diffusing layer provided on an outer surface of the polarizing plate to diffuse light from the single refraction layer.

According to the invention, there is further provided a liquid crystal display device of a reflection type including a transparent substrate, a liquid crystal layer provided behind the transparent substrate, and reflecting means provided behind the liquid crystal layer to introduce external light through the transparent substrate, reflect it by the reflecting means and externally release it through the transparent substrate to thereby display a predetermined image, comprising:

a single refraction layer provided on a front surface side of the transparent substrate;

a polarizing plate provided on the single refraction layer; and a diffusing layer provided on the polarizing plate to diffuse light from the single refraction layer.

In these liquid crystal display devices, the diffusing layer may be a multiplex refraction layer for refracting light from said single refraction layer toward a plurality of directions.

These liquid crystal display devices may further comprise a $\lambda/4$ phase plate interposed between said single refraction layer and said polarizing plate.

The crystal layer may be switched in response to an applied voltage between a mode for releasing incident light to the single refraction layer while maintaining the phase thereof and a mode for releasing incident light after shifting the phase there of by $\pi/2$.

The liquid crystal layer may be a twisted nematic liquid crystal.

The mirror-reflection layer may commonly function as a driving electrode on the part of said rear substrate for applying a voltage to said liquid crystal layer.

The single refraction layer may be made by spreading transparent grains with a second refractive index in a transparent medium with a first refractive index different from the second refractive index.

The single refraction layer may have a haze degree Hd (%) equal to or lower than 46.

The diffusing layer may be a multiplex refraction layer for refracting light from the single refraction layer toward a plurality of directions, has a haze degree Hz (%) not larger than 40/t (where t is the distance from said multiplex refraction layer to said mirror-reflecting layer).

The multiplex refraction layer and said single refraction layer may have in combination a total haze Ht (%) not less than 50 and not larger than 70.

By using any of the above-summarized constructions, refraction powers of the single refraction layer and the diffusing layer can be chosen within a range preventing "coloring" or blurs of letters, and after the single refraction layer refracts incident light in a certain direction while maintaining its vibrating direction, the diffusing layer refracts the light from the single refraction layer in random directions. Therefore, sufficient diffusion of light is realized without disordering polarized components of light from liquid crystal cells. As a result, the invention realizes both a view angle equivalent or wider than that of a conventional device and a high display quality without "coloring" and letter blurs.

BRIEF DESCRIPTION OF THE DRAWINGS

The present invention will be understood more fully from the detailed description given herebelow and from the accompanying drawings of the preferred embodiments of the invention. However, the drawings are not intended to imply limitation of the invention to a specific embodiment, but are for explanation and understanding only.

In the drawings:

FIG. 3 is a diagram showing a result of measurement of the optical property of the single refraction layer in an embodiment of the invention;

FIG. 4 is a diagram showing a result of measurement of the optical property of a multiplex refraction layer in an embodiment of the invention; and FIG. 5 is a diagram showing a result of measurement of the optical property of a combination of a single refraction layer and a multiplex refraction layer in an embodiment of the invention.

DETAILED DESCRIPTION OF THE PREFERRED EMBODIMENTS

Figure 1:
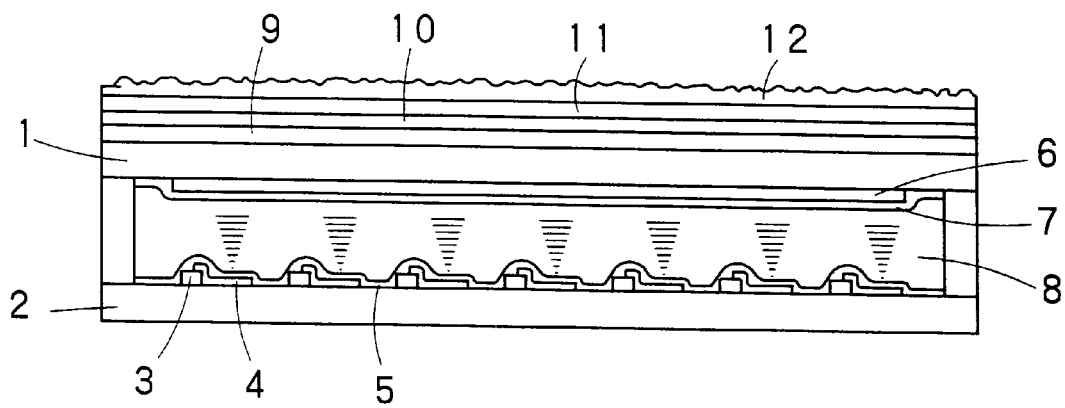
FIG. 1 is a cross-sectional view of a liquid crystal display device according to an embodiment of the invention.

An embodiment of the invention is explained below with reference to the drawings. FIG. 1 is a cross-sectional view of a liquid crystal display device according to the embodiment. On a rear substrate 2 made of glass or quartz, TFT 3 and pixel electrodes 4 connected thereto are provided in an matrix arrangement. Further provided are drive wirings, not shown) for driving TFT 3, and all these elements are entirely covered by an aligning layer 5. The pixel electrodes 4 are reflective electrodes of aluminum, for example, and their surfaces are configured as mirrors for mirror-reflecting light arriving there. The pixel electrodes 4 having the mirror-reflecting function can be made by sputtering at a low temperature upon vapor deposition of aluminum.

On the entire inner surface of a front substrate 1 made of glass, for example, are an opposite electrode 6, made of ITO (indium tin oxide) or any other appropriate transparent electrode material, and an aligning layer 7. Between the front substrate 1 and the rear substrate 2, a TN (twisted nematic) liquid crystal layer 8 is confined. Furthermore, sequentially stacked on the outer surface of the front substrate 1 are a single refraction layer 9, λ/4 phase plate 10, linearly polarizing plate 11 and multiplex refraction layer 12.

The polarizing plate 11 and the phase plate 10 are piled so that the absorption axis of the former and the delay phase axis of the latter make the angle of 45°. As a result, light entering from the observer side via the polarizing plate 11 is converted to circularly polarized light by the phase plate 10. The liquid crystal layer 8 is so oriented that its twisted angle makes such an angle with the delay phase axis of the phase plate 10 that incident light to the liquid crystal layer 8 changes its phase by λ/4 until reaching the pixel electrodes 4.

As a result, in the state where an OFF voltage is applied to the liquid crystal layer 8 (liquid crystal layer 8 is initial-oriented), circularly polarized light entering into the liquid crystal layer 8 is converted to linearly polarized light, then reaches the pixel electrodes 4, reflected by surfaces of the pixel electrodes 4, and it is again converted to circularly polarized light while passing through the liquid crystal layer 8. Thereafter, it is again converted by the phase plate 10 to linearly polarized light vibrating in the same direction as the transmission axis of the polarizing plate 11, and returns towards the observer side.

In the state where an ON voltage is applied to the liquid crystal layer 8 (liquid crystal is untwisted and oriented vertically of the substrate), circularly polarized plate entering into the liquid crystal layer 8 reaches the pixel electrodes 4 while maintaining polarized components, and reflected thereby with a deviation of π/2 in polarization polarity. Then, still maintaining the polarized components, it passes through the liquid crystal layer 8, and converted by the phase plate 10 to linearly polarized light vibrating in the same direction as that of the absorption axis of the polarizing plate 11. As a result, the reflected light is absorbed by the polarizing plate 11 and does not return to the observer side.

Figure 2:
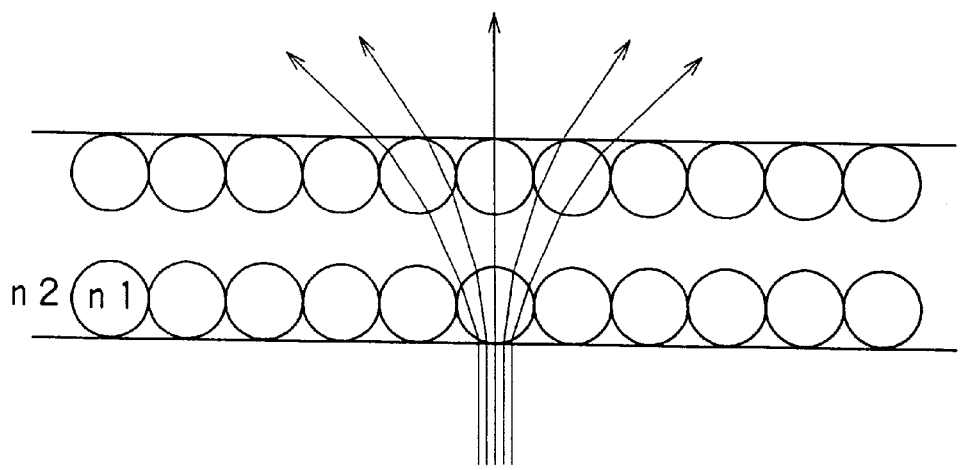
FIG. 2 is a schematic diagram showing construction of a single refraction layer in an embodiment of the invention.

Usable as the multiplex refraction layer 12 is one configured to release light by refracting the incident light so that it vibrates in random directions. FIG. 2 is a diagram roughly sketching a cross-sectional structure of a single refraction layer 9. As illustrated here, the single refraction layer 9 may be made by spreading transparent balls having the refractive index of n1 in a low density in a transparent medium having the refractive index of n2. By using the single refraction layer 9, light can be released by refracting incident light to a particular direction while maintaining its vibrating direction.

In the basic construction explained above, a required view angle can be obtained by the total scattering power of the single refraction layer 9 and the multiplex refraction layer 12, and the refraction power of the multiplex refraction layer 12 can be held within a range not causing letter blurs. Additionally, by determining the refraction power of the single refraction layer 9 within a range not causing "coloring", a liquid crystal display device with a wide view angle and a high display quality can be realized.

Scattering power of each refraction layer can be rated by "haze degree". In this invention, "haze degree H" of a sample is defined by the following equation:

$$H = 1 - I/I_0$$

where $I_0$ is the intensity of incident light entering from a normal direction to the sample, and I is the intensity of light exiting from the sample within the angles ±1° about the normal direction.

Furthermore, the Inventors made the following experiment to clarify optimum optical conditions of the single refraction layer 9 and the multiplex refraction layer 12.

First, a research was made to obtain the relation between the haze degree Hd of the single refraction layer 9 and "coloring". Its results is shown in FIG. 3. The ordinate of FIG. 3 is chroma C* which is expressed by the square root of the sum of the squares of a* and b* in the CIE1976 (L*, a*, b*) uniform color space. When this value exceeds 24, "coloring" is recognized to exist.

C* correlates with the degree Hd (%) of haze of the single refraction layer. The value of Hd upon C* being 24 has been confirmed to be 46 by researches of the Inventor. Therefore, it has been confirmed that the haze degree Hd may be 46 or less to prevent "coloring".

Next to that, in order to obtain conditions for reliably preventing letter blurs under the above-obtained condition, investigation was made on the presence of absence of letter blurs by changing the haze degree Hz of the multiplex refraction layer 12 and the distance t (mm) from the back surface of the multiplex refraction layer 12 to the mirror-reflecting layer, i.e., pixel electrodes 4. In the illustrated example, the distance t corresponds to the sum of thicknesses of the single refraction layer 9, opposite electrode 6, aligning layer 7 and liquid crystal layer 8.

FIG. 4 is a graph showing relations between the haze degree Hz and the distance t thus obtained.

In FIG. 4, letters blurred below the approximation curve and blurred above the curve. The approximation curve can be expressed by the equation of Hz=40/t in terms of the haze degree of the multiplex refraction layer. Therefore, it has been confirmed that the haze degree Hz may be 40/t or less to prevent letter blurs.

The Inventors next made a research to obtain relations between the total haze degree Ht and the view angle of the liquid crystal display device including the multiplex refraction layer 12 and the single refraction layer 9 disposed as shown in FIG. 1. The "view angle" is defined here as a range of angles ensuring a reflectance of the sample not smaller than 30% when the reflectance of a reference white reflection late having a full diffusion surface. This is a range of angles where the same luminance as the surface luminance 70 nit of the transmission type liquid crystal panel is obtained under the condition of 750 lx (lux) which is the illuminance recommended by The Illuminating Engineering Institute of Japan. That is, if the luminance of light output onto the front surface of the liquid crystal panel is 70 nit when light inclined by 30° from the normal direction is irradiated, it evidences the view angle of 60°.

FIG. 3 is a diagram showing the measured relationship between the total haze degree Ht and the view angle. As can be seen in FIG. 5, the total haze degree may preferably be not lower than 50 and not higher than 70 in order to obtain the view angle equal to or larger than 60° which may be the practical lower limit.

In this example, an anti-glare film integral with the polarizing plate 11, model No. EG1425DUA51AR (manufactured by Nittoh Denko Kabushiki Kaisha, with the haze degree of 25) was used as the multiplex refraction layer 12 satisfying the above-explained conditions. Similarly, as the single refraction layer 9, a low-density grain-diffused film, model No. IDS16 (manufactured by Dainihon Printing Kabushiki Kaisha, with the haze degree of 42) was used. The total haze degree of these refraction layers is 59.5.

The liquid crystal display device prepared as this example was actually driven, and its display was observed. As a result, no letter blurs or "coloring" was observed, and the view angle of 60° was confirmed. That is, both a wide view angle and a high display quality have been realized.

While the present invention has been disclosed in terms of the preferred embodiment in order to facilitate better understanding thereof, it should be appreciated that the invention can be embodied in various ways without departing from the principle of the invention. Therefore, the invention should be understood to include all possible embodiments and modification to the shown embodiments which can be embodied without departing from the principle of the invention as set forth in the appended claims.

The entire disclosure of Japanese Patent Application No.H10-181747 filed on Jun. 29, 1998 including specification, claims, drawings and summary is incorporated herein by reference in its entirety.

What is claimed is:

1. A liquid crystal display device comprising:
    a front substrate and a rear substrate disposed in a mutually facing relation;
    a liquid crystal layer sandwiched between said front substrate and said rear substrate;
    a mirror-reflection layer provided on said rear substrate;
    a single refraction layer provided on an outer surface of said front substrate;
    a polarizing plate provided on an outer surface of said single refraction layer; and
    a diffusing layer provided on an outer surface of said polarizing plate to diffuse light from said single refraction layer,
    refraction powers of said single refraction layer and said diffusing layer being chosen within a range substantially preventing coloring or blurs;
    said single refraction layer refracting incident light in a certain direction while maintaining vibrating direction thereof, and
    said diffusing layer refracting light from said single refraction layer in random directions so that sufficient diffusion of light is realized without disordering polarized component of light from said liquid crystal layer.

2. The liquid crystal display device according to claim 1 further comprising a λ/4 phase plate interposed between said single refraction layer and said polarizing plate.

3. The liquid crystal display device according to claim 2 wherein said liquid crystal layer is switched in response to an applied voltage between a mode for releasing incident light to said single refraction layer while maintaining the phase thereof and a mode for releasing incident light after shifting the phase thereof by π/2.

4. The liquid crystal display device according to claim 3 wherein said liquid crystal layer is a twisted nematic liquid crystal.

5. The liquid crystal display device according to claim 1 wherein said mirror-reflection layer commonly functions as a driving electrode on the part of said rear substrate for applying a voltage to said liquid crystal layer.

6. The liquid crystal display device according to claim 1 wherein said single refraction layer is made by spreading transparent grains with a second refractive index in a transparent medium with a first refractive index different from said second refractive index.

7. The liquid crystal display device according to claim 1 wherein said single refraction layer has a haze degree Hd (%) not larger than 46.

8. The liquid crystal display device comprising:
    a front substrate and a rear substrate disposed in a mutually facing relation;
    a liquid crystal layer sandwiched between said front substrate and said rear substrate;
    a mirror-reflection layer provided on said rear substrate;
    a polarizing plate provided on an outer surface of said front substrate;
    a single refraction layer provided between said liquid crystal layer and said polarizing plate on an outer side of said front substrate; and
    a diffusing layer provided on an outer surface of said polarizing plate,
    said single refraction layer refracting and diffusing an incident polarized light while keeping the polarized condition thereof,
    said diffusing layer performing multiple-reflection and multiple-refraction of said polarized light while suppressing a wavelength dispersion and coloring thereof.

9. The liquid crystal display device according to claim 8 further comprising a λ/4 phase plate interposed between said single refraction layer and said polarizing plate.

10. The liquid crystal display device according to claim 9 wherein said liquid crystal layer is switched in response to an applied voltage between a mode for releasing incident light to said single refraction layer while maintaining the phase thereof and a mode for releasing incident light after shifting the phase there of by π/2.

11. The liquid crystal display device according to claim 10 wherein said liquid crystal layer is a twisted nematic liquid crystal.

12. The liquid crystal display device according to claim 8 wherein said mirror-reflection layer commonly functions as a driving electrode on the part of said rear substrate for applying a voltage to said liquid crystal layer.

13. The liquid crystal display device according to claim 8 wherein said single refraction layer is made by spreading transparent grains with a second refractive index in a transparent medium with a first refractive index different from said second refractive index.

14. The liquid crystal display device according to claim 8 wherein said single refraction layer has a haze degree Hd (%) not larger than 46.

15. The liquid crystal display device comprising:
- a front substrate and a rear substrate disposed in a mutually facing relation;
- a liquid crystal layer sandwiched between said front substrate and said rear substrate;
- a mirror-reflection layer provided on said rear substrate;
- a single refraction layer provided on an outer surface of said front substrate;
- a polarizing plate provided on an outer surface of said single refraction layer; and
- a diffusing layer provided on an outer surface of said polarizing plate to diffuse light from said single refraction layer,
- wherein said diffusing layer is a multiplex refraction layer for refracting light from said single refraction layer toward a plurality of directions, and has a haze degree Hz (%) not larger than 40/t (where t is the distance from said multiplex refraction layer to said mirror-reflecting layer).

16. The liquid crystal display device according to claim 15 wherein said multiplex refraction layer and said single refraction layer have in combination a total haze Ht (%) not less than 50 and not larger than 70.

17. The liquid crystal display device of a reflection type including a transparent substrate, a liquid crystal layer provided behind said transparent substrate, and reflecting means provided behind said liquid crystal layer to introduce external light through said transparent substrate, reflect it by said reflecting means and externally release it through said transparent substrate to thereby display a predetermined image, comprising:
- a single refraction layer provided on a front surface side of said transparent substrate;
- a polarizing plate provided on said single refraction layer; and
- a diffusing layer provided on said polarizing plate to diffuse light from said single refraction layer,
- wherein said diffusing layer is a multiplex refraction layer for refracting light from said single refraction layer toward a plurality of directions, and has a haze degree Hz (%) not larger than 40/t (where t is the distance from said multiplex refraction layer to said mirror-reflecting layer).

18. The liquid crystal display device according to claim 17 wherein said multiplex refraction layer and said single refraction layer have in combination a total haze Ht (%) not less than 50 and not larger than 70.

* * * * *